(12) United States Patent
Strand

(10) Patent No.: US 10,556,473 B2
(45) Date of Patent: Feb. 11, 2020

(54) SYSTEM AND METHOD FOR CONNECTING OR DISCONNECTING A TRAILER TO A VEHICLE

(71) Applicant: Smart Patents AS, Jakobsli (NO)

(72) Inventor: Dag Arild Aamodt Strand, Jakobsli (NO)

(73) Assignee: Smart Patents AS, Trondheim (NO)

(*) Notice: Subject to any disclaimer, the term of this patent is extended or adjusted under 35 U.S.C. 154(b) by 0 days.

(21) Appl. No.: 15/798,539

(22) Filed: Oct. 31, 2017

(65) Prior Publication Data

US 2018/0050573 A1 Feb. 22, 2018

Related U.S. Application Data

(63) Continuation-in-part of application No. 14/904,070, filed as application No. PCT/NO2014/050105 on Jun. 19, 2014, now Pat. No. 9,834,049.

(30) Foreign Application Priority Data

Jul. 11, 2013 (NO) .................................... 20130966

(51) Int. Cl.
| | |
|---|---|
| B60D 1/36 | (2006.01) |
| B60D 1/42 | (2006.01) |
| B60D 1/06 | (2006.01) |
| B60D 1/155 | (2006.01) |
| B60D 1/62 | (2006.01) |
| B60D 1/54 | (2006.01) |

(52) U.S. Cl.
CPC ............. *B60D 1/36* (2013.01); *B60D 1/06* (2013.01); *B60D 1/155* (2013.01); *B60D 1/42* (2013.01); *B60D 1/54* (2013.01); *B60D 1/62* (2013.01)

(58) Field of Classification Search
CPC . B60D 1/36; B60D 1/155; B60D 1/42; B60D 1/54; B60D 1/62; B60D 1/06
USPC ....................................................... 280/479.1
See application file for complete search history.

(56) References Cited

U.S. PATENT DOCUMENTS 2,612,384 A 9/1952 Wiegman
4,226,103 A * 10/1980 Strickland ............... B60R 25/08
70/14

(Continued)

FOREIGN PATENT DOCUMENTS

| DE | 102010004920 A1 | 7/2011 |
|---|---|---|
| EP | 1535765 B1 | 4/2006 |
| EP | 2602132 A1 | 6/2013 |

OTHER PUBLICATIONS

Norwegian Search Report 20130966, dated Jan. 23, 2014.
International Preliminary Report on Patentability, European Patent Office, dated Oct. 29, 2015.

*Primary Examiner* — Jacob D Knutson
(74) *Attorney, Agent, or Firm* — Sughrue Mion, PLLC

(57) ABSTRACT

A trailer (102) for connecting to a vehicle (101), comprising a trailer coupler (103), at least one means for support (104) of the trailer (102) when not connected to the vehicle (101), and at least one parking brake (105) further characterized in that a control center (106) is connected to a at least one motor (108) for automatically raising and lowering said at least one means for support (104), and the control center (106) automatically engages and disengages said at least one parking brake (105) via a control mechanism (107) when the trailer coupler (103) is connected to a tow bar (201).

17 Claims, 2 Drawing Sheets

(56) References Cited

U.S. PATENT DOCUMENTS

| | | | |
|---|---|---|---|
| 4,988,116 A * | 1/1991 | Evertsen | B60D 1/363 |
| | | | 280/477 |
| 6,000,709 A | 12/1999 | Gentner et al. | |
| 6,164,681 A | 12/2000 | Grammer | |
| 7,494,154 B2 * | 2/2009 | Richards | B60D 1/66 |
| | | | 180/11 |
| 7,690,671 B1 | 4/2010 | Jensen | |
| 7,926,832 B1 * | 4/2011 | Hall | B60D 1/065 |
| | | | 280/417.1 |
| 8,444,169 B1 * | 5/2013 | Katz | B60D 1/62 |
| | | | 280/477 |
| 2002/0125018 A1 | 9/2002 | Gerd et al. | |
| 2005/0167945 A1 | 8/2005 | Rimmelspacher et al. | |
| 2006/0255560 A1 | 11/2006 | Dietz | |
| 2006/0290100 A1 | 12/2006 | Miller | |
| 2006/0293800 A1 | 12/2006 | Bauer et al. | |
| 2007/0007749 A1 | 1/2007 | Gentner et al. | |
| 2007/0069502 A1 * | 3/2007 | Sandler | B60D 1/065 |
| | | | 280/511 |
| 2007/0222183 A1 | 9/2007 | Daniel | |
| 2009/0236825 A1 | 9/2009 | Okuda et al. | |
| 2010/0096203 A1 | 4/2010 | Freese, V et al. | |
| 2011/0216199 A1 | 9/2011 | Trevino et al. | |
| 2012/0191285 A1 | 7/2012 | Woolf et al. | |
| 2014/0218506 A1 * | 8/2014 | Trombley | B60R 1/003 |
| | | | 348/113 |
| 2015/0102583 A1 * | 4/2015 | Reimer | B60D 1/015 |
| | | | 280/433 |
| 2017/0158007 A1 * | 6/2017 | Lavoie | B60T 7/20 |
| 2017/0240125 A1 * | 8/2017 | Weigert | B60Q 1/34 |

* cited by examiner

SYSTEM AND METHOD FOR CONNECTING OR DISCONNECTING A TRAILER TO A VEHICLE

This is a Continuation in Part of application Ser. No. 14/904,070 filed Jan. 8, 2016, which is a National Stage of International Application No. PCT/NO2014/050105, filed Jun. 19, 2014, which claims priority based on Norwegian Patent Application No. 20130966 filed Jul. 11, 2013, the contents of all of which are incorporated herein by reference in their entirety.

TECHNICAL FIELD

The present invention regards a trailer, and more particularly an automated trailer that readies itself for use when being connected to a vehicle, and furthermore, readies itself for parking when being disconnected from a vehicle.

BACKGROUND OF THE INVENTION

Connecting a trailer to a vehicle can be a tiresome and needlessly difficult process. In addition to connecting the trailer to the tow bar of the vehicle, the power cord must be connected, the parking brakes must be disconnected and the support wheel or the support column(s) must be raised, if the trailer has these features. Connecting smaller trailers to the vehicle can also be strenuous, since the user often has to lift the trailer on to the tow bar.

US 20070007749 describes a coupling having a ball neck body pivoted around an axis between the operating and the rest positions. Rotation blocking bodies are placed in connection with an actuation mechanism, in order to direct the reaction forces perpendicular to the pivot axis.

US 20050167945 describes a device which is designed as a ball member to be connected to a fastener located on the trailer. The vehicle has a tow bar mounted behind the rear bumper. The coupling comprises a container fitted to a component that uses a load bearing component and slides into a locked position by means of a spring supported locking element for attaching the device in a resting or working position.

EP 1535765 describes a trailer coupling for motor vehicles which has a coupling arm with drive means acting on a rotary axis element through a rotational bearing. By means of a movement device, the mounting piece is pressed into a recess that holds the coupling to the connector housing in order to lock it therein.

All these documents describe different solutions for a tow bar that can be hidden and retrieved when you need it. The problem with these solutions is that they have an esthetic purpose only. These solutions solve the following problem; how to hide a tow bar on a vehicle when it is not in use. None of these solutions simplify the attaching of a trailer to the tow bar of a vehicle, and none of these solutions give the user any indication whether the trailer is securely and properly attached to the vehicle. This means that the challenges with connecting a trailer to a vehicle are still the same.

SUMMARY OF THE INVENTION

It Is an object of the present invention, as described in the set of claims, to solve the problems mentioned above. The invention discloses an automated trailer 102 that has the ability to raise or lower the support means of the trailer 102 and engage or disengage the parking brake(s) when connected to a tow bar 201. In an embodiment of the present invention the power cord can also be connected automatically.

When the tow bar 201 and the trailer coupler 103 are connected, the link between the vehicle 101 and the trailer 102 will automatically be locked. The parking brakes on the trailer 102 will automatically disconnect and the support means will be raised. Further, you can automatically connect a pneumatic system, safety wire and electric cable.

In order to aid the connection the design of the trailer coupler 103 allows the tow bar 201 to be guided into the fitting on the trailer 102, e.g. by having a conical opening and/or being magnetic.

In a further embodiment, a wireless connection will provide communication between the vehicle 101 and the trailer 102. The vehicle 101 will then be able to send signals to the trailer 102 telling it which lights should be activated.

DETAILED DESCRIPTION

Figure 1:
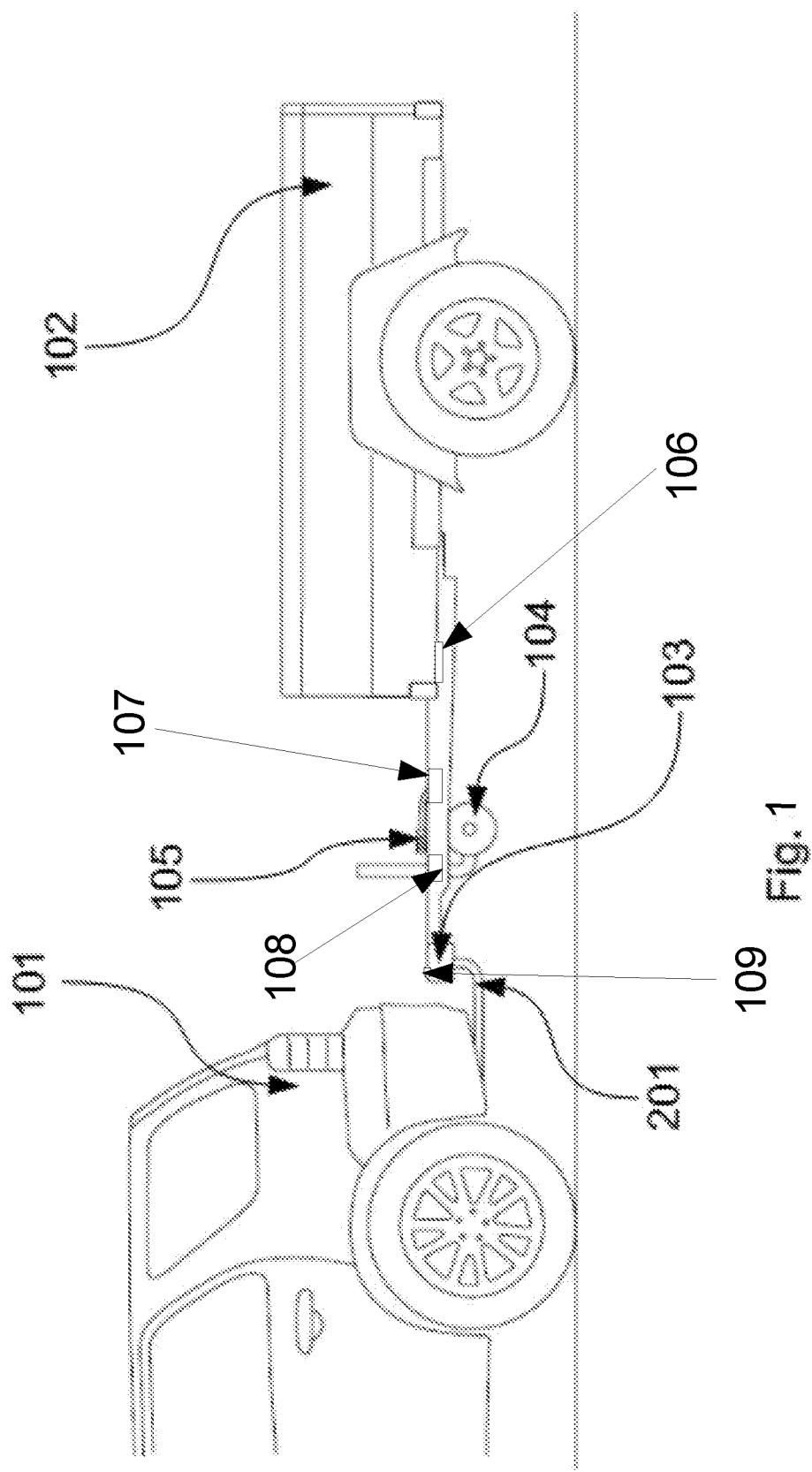
FIG. 1 is a side view image of one embodiment of the invention in which the trailer 102 is connected to the vehicle 101.

FIG. 1 is a side view image of one embodiment of the present invention wherein the tow bar 201 is connected to the trailer coupler 103. In a preferred embodiment of the present invention the trailer 102 comprises means for attachment to a vehicle 101, at least one switch or at least one sensor 109 for indicating if the attachment is correct, a control center 106 for controlling the automated process, at least one motor 108 for controlling the raising and lowering of the support means and a control mechanism 107 for controlling the engaging and disengaging of the parking brakes. There can be a power source on the trailer 102, or there can be means for transferring power from the vehicle 101 to the trailer 102.

In an additional embodiment of the present invention there can also be means for attaching signal cables for lights etc. on the trailer 102. As an alternative solution all communication between the trailer 102 and the vehicle 101 can also be wireless.

When the vehicle 101 and the trailer 102 are connected, a signal is sent to the control center 106. The signal can be given by at least one switch or at least one sensor 109. The control center 106 can be located either on the trailer 102 or on the vehicle 101 itself.

The control center 106 gives a signal to at least one motor 108. The at least one motor 108 raises the support wheel 104 of the trailer 102. This feature can also be applied to support pillars if the trailer 102 has these.

Further the control center 106 sends a signal to a control mechanism 107. This control mechanism 107 disengages the parking brakes 105 on the trailer 102. The parking brakes can either be electric, pneumatic, hydraulic or mechanical. This control mechanism 107 can in an embodiment be an additional motor.

The power for the control center 106, the control mechanism 107 and the motor 108 controlling the support means, can come from a power source on the trailer 102. This power source can be a battery.

In an alternative solution the power can be transferred from the vehicle 101. Electrical power can be transferred from the vehicle 101 via the tow bar 201 to the trailer coupler 103 and further to the control center 106.

The control center 106 can further send power to the lights on the trailer 102. The signals controlling the lights can be sent wirelessly to the control center 106.

The signals controlling the lights can also be sent via a wire. In this solution the tow bar 201 and the trailer coupler 103 can have a coupling transferring the signals. This coupling can be as a part of the ball connection of the tow bar 201. Alternatively the coupling can be as part of a male/female contact mounted in connection with the tow bar 201/trailer coupler 103.

For connection between regular cars and trailers 102 with brakes, it is common to use a safety chain. The connection of this safety chain can also be done automatically. One solution could be using a safety chain that is attached to the trailer coupler 103 and is dropped down when the tow bar 201/trailer coupler 103 are connected. Alternatively the safety chain can be placed correctly by a robotic arm.

A further alternative is that in addition to linking the tow bar 201 and the trailer 102 together, the pneumatic cables for the trailer 102 brakes can also be connected automatically.

In an even further embodiment, the trailer coupler 103 on the trailer 102 and/or the tow bar 201 can be magnetic. This makes it easier for the tow bar 201 to connect to the trailer coupler 103 on the trailer 102.

The trailer coupler 103 may advantageously have a conical collar around the opening of the connection point. This is in order to make it easier to guide the tow bar 201 into place.

Figure 2:
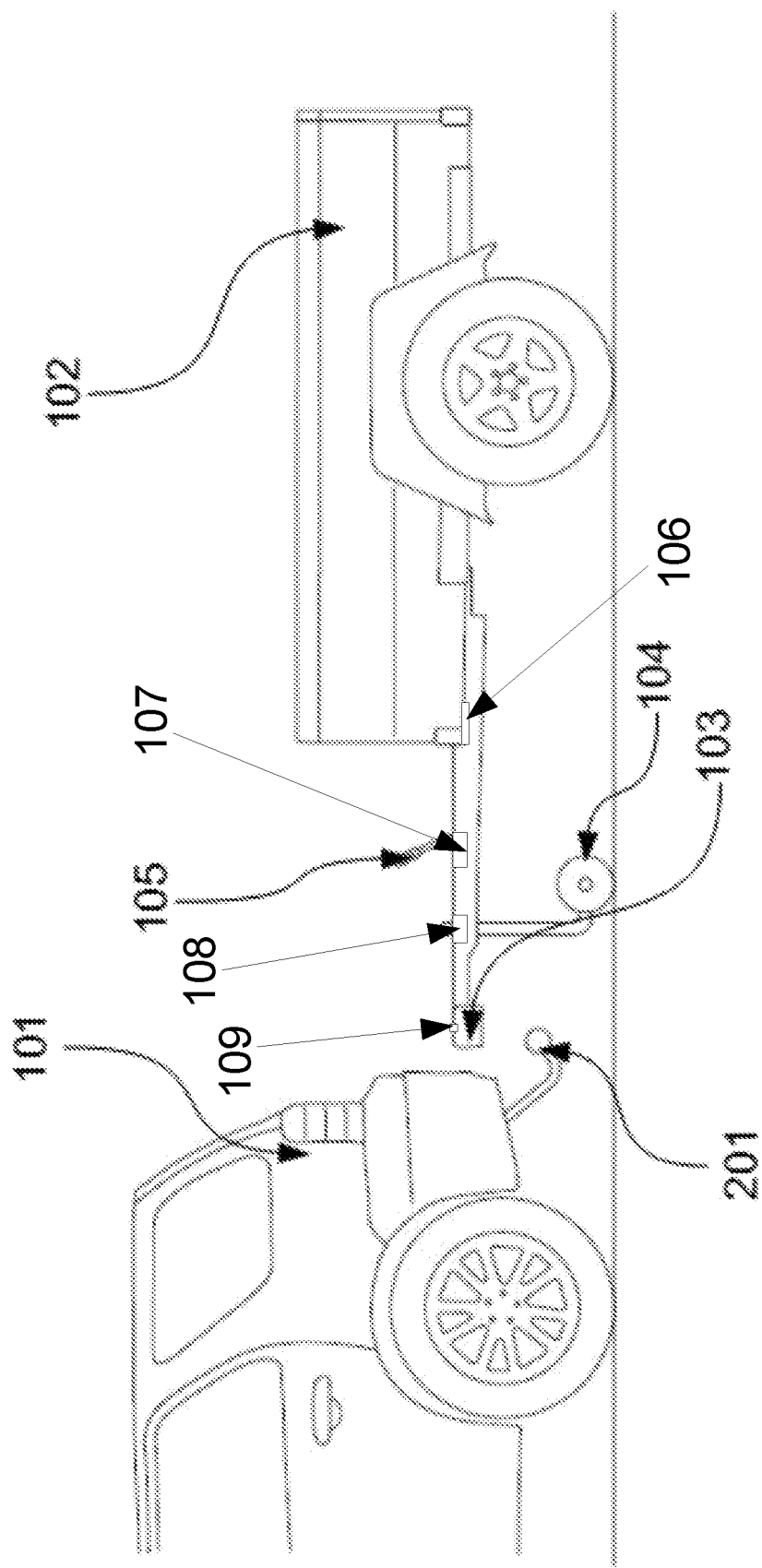
FIG. 2 is a side view image of one embodiment of the invention wherein the tow bar 201 is activated.

FIG. 2 shows a side view image of one embodiment of the present invention in which the trailer 102 is disconnected from the vehicle 101.

When disconnecting the trailer 102 from the vehicle 101, the user deactivates the tow bar 201. When the signal for disconnecting the trailer 102 from the vehicle 101 is sent, the control center 106 gives a signal to the at least one motor 108. The at least one motor 108 lowers the support wheel 104 or the support column(s).

Further a signal is sent to the control mechanism 107 which engages the parking brake(s) 105. When this is done, the tow bar 201 can be disconnected from the trailer coupler 103.

When coupling trailers 102 of larger types, with e.g. a truck or a dumper truck, it would be natural to imagine a system having an automatic rising of the pillars of the trailer 102.

An additional action that may be made easier by the present invention is the connecting of security bolts between larger vehicles 101 and trailers 102. When connecting trailers 102 to larger vehicles 101, such as a truck or a dumper truck, one can make use of an automatic triggering of the safety pin when the trailer 102 and the truck or dumper truck are properly connected. A possible solution for this is to have a switch mounted on the link that is only activated when the trailer 102 and the truck or dumper truck are properly connected. Alternatively, this can be controlled from the cabin.

It is further important that the parking brake(s) 105 and the support features 104 are not deactivated before the coupling of the trailer 102 and the vehicle 101 is secured. It is therefore also important that the parking brake(s) 105 and the support features 104 are engaged before the disconnection of the trailer 102 from the vehicle 101.

When connecting all the necessary cables going from the vehicle 101 to the trailer 102, the connection points can be mounted on springs that are stiff when not connected, but become bendable when connected. These can also be lockable joints, switches or similar. This feature makes the automatic connection easier, but still allow for movement of the trailer 102 relative to the vehicle 101 during travel. The automatic connection of cables may also be aided by a robotic arm.

The activation or deactivation of the brakes can be achieved by a motor controlled by the control center 106.

A further technical feature is a confirmation signal that indicates whether the connection of the vehicle 101 and the trailer 102 has been correctly carried out. This signal can be either audial, visual or both and gives a confirmation when the connection is properly carried out.

An alarm indicates if the connection of the vehicle 101 and the trailer 102 is not properly carried out. This alarm can be either audial, visual or both.

A backing camera, at least one reversing sensor 109 or at least one range finder can be added to the trailer 102. These devices can be automatically activated during reversing when the trailer 102 and the vehicle 101 are connected. The signals from these devices can be programmed to override any similar devices mounted on the vehicle 101 when the trailer 102 is connected to the vehicle 101. The signals are transferred to the cabin during reversing when the trailer 102 and the vehicle 101 are connected. During forward driving no signals are transmitted to the cabin from these devices.

Further the trailer coupler 103 can be resilient.

The control center 106 can be located either on the trailer 102 or on the vehicle 101. If the control center 106 is located on the vehicle 101, this requires a custom fitted system both on the vehicle 101 and on the trailer 102. However, the benefit is that the trailer 102 will be cheaper to produce since the on board computer in the vehicle 101 can be used as a control center 106.

The on board computer located in the vehicle 101 can become the control center 106 by installing additional software to the computer. At least one sensor 109 detects if a tow bar 201 is connected to the trailer coupler 103. This at least one sensor 109 can be located either on the trailer coupler 103 or on the tow bar 201. The at least one sensor 109 sends a signal to the control center 106 when the tow bar 201 and the trailer coupler 103 are correctly connected. The control center 106 gives a signal to at least one motor 108. The at least one motor 108 raises the support wheel 104 of the trailer 102. This feature can also be applied to support pillars if the trailer 102 has these.

Further the control center 106 sends a signal to a control mechanism 107. This control mechanism 107 disengages the parking brakes 105 on the trailer 102. The control mechanism 107 can in an embodiment be an additional motor which can be either electric, pneumatic, hydraulic or mechanical.

When disconnecting a trailer from a vehicle, this process is reversed.

Electrical power can be transferred from the vehicle 101 via the tow bar 201 to the trailer coupler 103 or it can be transferred via a special coupling.

All signals and communications in this system can either be wireless or wired.

Any combination of automatic/manual connecting of lights, hydraulic pipes, safety chains etc. can be used in this system. Anything from a pure manual connection to a pure automatically connecting or any combination of the two.

The present invention is not restricted to a specific tow bar 201 solution, but can be used for all types of couplings between tow bars 201 and trailers 102. The system can be used on both a premounted tow bar 201 and a retrofitted tow bar 201.

The invention claimed is:

1. A trailer for connecting to a vehicle provided with a tow bar, comprising:
   a trailer coupler adapted for attachment to the tow bar of the vehicle,
   at least one means for support of the trailer when not connected to the vehicle,
   at least one parking brake, and
   a control center connected to at least one motor for raising and lowering said at least one means for support of the trailer, and
   a control mechanism configured to engage and disengage the at least one parking brake, wherein
   the tow bar or the trailer coupler is provided with at least one switch or sensor that detects attachment of the trailer to the tow bar of the vehicle, and
   the control center, based on receiving a signal from the at least one switch or sensor that indicates attachment of the trailer coupler to the tow bar of the vehicle, controls the control mechanism to automatically disengage the at least one parking brake via the control mechanism and controls the at least one motor to raise the at least one means for support.

2. A trailer according to claim 1, wherein said control center receives a signal from the vehicle indicating that the trailer is to be disconnected from the vehicle.

3. A trailer according to claim 2, wherein said control center gives orders to lower the support means and engage the at least one parking brake in response to said control center receiving the signal from the vehicle indicating that the trailer is to be disconnected from the vehicle.

4. A trailer according to claim 2, wherein said control center gives orders to lower the support means and engage the at least one parking brake, before the trailer is disconnected from the vehicle, in response to said control center receiving the signal from the vehicle indicating that the trailer is to be disconnected from the vehicle.

5. A trailer according to claim 1, wherein the trailer coupler mounted on the trailer has a conical opening.

6. A trailer according to claim 5, wherein the trailer coupler mounted on the trailer comprises the conical opening and is magnetic.

7. A trailer according to claim 1, wherein the trailer coupler mounted on the trailer is magnetic.

8. A trailer according to claim 7, wherein the trailer coupler mounted on the trailer comprises a conical opening and is magnetic.

9. A trailer according to claim 1, wherein said at least one support means is either at least one support wheel or at least one support column.

10. A trailer according to claim 1, wherein said trailer has a receiver for receiving a wireless transmission from the vehicle that provides control of the light signals on the trailer.

11. A trailer according to claim 1, wherein the trailer coupling has a locking means preventing deactivation during speed.

12. A trailer according to claim 1, wherein the motor is pneumatic, electric, mechanical or hydraulic.

13. A trailer according to claim 1, wherein there is a system attached to the trailer that gives the driver an indication of obstacles behind the trailer when the trailer is backing up.

14. A trailer according to claim 1, further comprising:
   a pneumatic cable that is connected to the at least one parking brake, the pneumatic cable of the trailer configured to be automatically connected with a pneumatic cable of the vehicle when the tow bar becomes connected to the trailer coupler.

15. A trailer according to claim 14, further comprising:
   at least one from among a spring, a lockable joint, a switch, or a robotic arm that is configured to automatically connect the pneumatic cable of the trailer to the pneumatic cable of the vehicle.

16. A trailer for connecting to a vehicle, comprising:
   a trailer coupler,
   at least one means for support of the trailer when not connected to the vehicle,
   at least one parking brake,
   a pneumatic cable that is connected to the at least one parking brake, the pneumatic cable of the trailer configured to be automatically connected with a pneumatic cable of the vehicle when a tow bar of the vehicle becomes connected to the trailer coupler, and
   a control center connected to at least one motor for automatically raising and lowering said at least one means for support, and the control center automatically engages and disengages said at least one parking brake via a control mechanism when the trailer coupler is connected to the tow bar, wherein
   said control center gives orders to disengage the at least one parking brake in response to the tow bar becoming connected to the trailer coupler.

17. A trailer according to claim 16, further comprising:
   at least one from among a spring, a lockable joint, a switch, or a robotic arm that is configured to automatically connect the pneumatic cable of the trailer to the pneumatic cable of the vehicle.

* * * * *